(12) United States Patent
Jacquet et al.

(10) Patent No.: US 8,834,626 B2
(45) Date of Patent: *Sep. 16, 2014

(54) IMPURITY INERTING COMPOSITION

(75) Inventors: Alain Jacquet, Saint Didier de Formans (FR); Emmanuel Villard, Saint-Chirsto-en-Jarez (FR); Olivier Watt, Saint Jean de Soudain (FR)

(73) Assignee: Lafarge (FR)

( * ) Notice: Subject to any disclaimer, the term of this patent is extended or adjusted under 35 U.S.C. 154(b) by 1791 days.

This patent is subject to a terminal disclaimer.

(21) Appl. No.: 11/575,607

(22) PCT Filed: Sep. 21, 2005

(86) PCT No.: PCT/FR2005/002344
§ 371 (c)(1),
(2), (4) Date: Mar. 20, 2007

(87) PCT Pub. No.: WO2006/032786
PCT Pub. Date: Mar. 30, 2006

(65) Prior Publication Data
US 2008/0060556 A1  Mar. 13, 2008

(30) Foreign Application Priority Data

Sep. 21, 2004 (FR) .................................. 04 09968
Jun. 28, 2005 (FR) .................................. 05 06594

(51) Int. Cl.
| | | |
|---|---|---|
| *C04B 7/00* | (2006.01) | |
| *C04B 16/00* | (2006.01) | |
| *C04B 24/00* | (2006.01) | |
| *C04B 24/10* | (2006.01) | |
| *C04B 28/02* | (2006.01) | |
| *C08K 3/00* | (2006.01) | |
| *C04B 24/30* | (2006.01) | |
| *C08G 73/02* | (2006.01) | |
| *C08G 12/16* | (2006.01) | |
| *C04B 24/26* | (2006.01) | |
| *C04B 20/02* | (2006.01) | |
| *C04B 14/06* | (2006.01) | |
| *C04B 20/10* | (2006.01) | |

(52) U.S. Cl.
CPC ............ *C04B 20/1018* (2013.01); *C04B 24/30* (2013.01); *C08G 73/0226* (2013.01); *C04B 2201/10* (2013.01); *C08G 12/16* (2013.01); *C04B 24/2652* (2013.01); *C04B 20/02* (2013.01); *C04B 20/023* (2013.01); *C04B 2201/20* (2013.01); *C04B 14/06* (2013.01)
USPC .......................................... 106/802; 524/650

(58) Field of Classification Search
USPC .......................................... 106/802; 524/650
See application file for complete search history.

(56) References Cited

U.S. PATENT DOCUMENTS

| | | | |
|---|---|---|---|
| 3,738,945 A | 6/1973 | Panzer et al. | |
| 4,158,521 A | 6/1979 | Anderson et al. | |
| 5,614,017 A * | 3/1997 | Shawl ........................... | 106/823 |
| 2002/0053413 A1* | 5/2002 | Zhang et al. ................ | 162/168.1 |
| 2004/0108277 A1* | 6/2004 | Krulik ........................... | 210/723 |

FOREIGN PATENT DOCUMENTS

| | | |
|---|---|---|
| EP | 0 342 500 A | 11/1989 |
| FR | 1 042 084 A | 10/1953 |
| JP | 61 006164 A | 1/1986 |
| JP | 05 221701 A | 8/1993 |
| JP | 09 132444 A | 5/1996 |
| JP | 09 221346 A | 8/1997 |
| WO | WO 85/01935 | 5/1985 |
| WO | WO 98/58887 | 12/1998 |

OTHER PUBLICATIONS

English translation of applicant admitted prior art, JP09-221346.*
International Search Report for PCT/FR2005/002344 dated Nov. 6, 2006.

* cited by examiner

*Primary Examiner* — Shuangyi Abu Ali
(74) *Attorney, Agent, or Firm* — Lerner, David, Littenberg, Krumholz & Mentlik, LLP

(57) ABSTRACT

A method for inerting clays in sands which are intended for the preparation of hydraulic compositions, the method including a step of adding to the hydraulic composition, or to one of the constituents thereof, a composition which may include at least 50% by weight of a cationic polymer which has a density of cationic charges which is greater than 0.5 meq/g and an intrinsic viscosity which is less than 1 dl/g as an active substance. The hydraulic composition may be a concrete or a mortar.

29 Claims, No Drawings

IMPURITY INERTING COMPOSITION

The present invention relates to a composition which is advantageous for inerting harmful impurities, such as clays, in hydraulic compositions.

It is sometimes difficult to control the properties of hydraulic compositions in a consistent manner. The quality of the raw materials is often the cause of these variations. In particular, it has been found that sands, or more particularly the impurities which are contained in sands, such as clays, can bring about fluctuations in the properties of hydraulic compositions.

In some cases, these fluctuations are due to a decrease in the efficacy of plasticisers of the polymer type having a comb structure, also referred to as superplasticisers.

According to document WO 98/58887, the absorption of these polymers by swelling clays of the 2:1 type present in sands is the cause of this decrease in efficacy. It is known to eliminate clays and other impurities from sands by means of washing in water. The dirty water is then processed using a flocculation agent which allows the liquid/solid separation to be accelerated and thus allows clean water to be recovered. This water is then recycled in order to wash the sand again. However, this solution is costly in terms of equipment and requires a substantial supply of water. Furthermore, the washed sands generally contain residual flocculant which has negative effects on the properties of the hydraulic compositions.

The application JP 9-221346 proposes neutralising the negative effect of the residual flocculent of the anionic polymer type by adding a cationic polymer.

Another solution involves not separating the clays from the sands, but instead inerting the clays in the sands. Document WO 98/58887 proposes the use of agents which modify the activity of the clay, for example, by reducing the absorption capacity thereof or by carrying out a pre-absorption operation. The document proposes, inter alia, the use of organic or inorganic cations, including quaternary (poly)amines which may be alkoxylated.

However, the agents described are still not entirely satisfactory in terms of efficiency. It is thus necessary to add a large measure of agents in order to process materials which have a significant content in terms of impurities. A large measure results in costs which render the method disadvantageous on an industrial scale.

Furthermore, in contrast to the teaching of document WO 98/58887, different clays, of the type 1:1, for example, can also bring about a decrease in the quality of the hydraulic compositions.

The object of the present invention is therefore to provide a composition useful for reducing the undesirable effects linked to the presence of harmful impurities, such as clays. In particular, such a composition is sought which is robust, that is to say, effective for different hydraulic compositions. Furthermore, a composition is sought which is stable during storage, inexpensive and whose use does not require sophisticated equipment.

This object is achieved by a composition comprising a specific cationic polymer. Preferably, the specific cationic polymer is associated with an anionic polymer.

In this manner, the invention relates mainly to a composition useful for inerting clays in hydraulic compositions comprising at least 50% by weight of a cationic polymer which has a density of cationic charges which is greater than 0.5 meq/g and an intrinsic viscosity which is less than 1 dl/g as an active substance.

In the context of this description, the term "polymer" is intended to refer to a compound which comprises more than two monomeric units which may be identical or different and which may or may not have a specific order.

The term "cationicity" is intended to refer to the density of positive charges which are carried by a compound. The cationicity can be measured by means of colloidal titration.

The term "intrinsic viscosity" is intended to refer to the limit value of the reduced viscosity $\eta i/c$ with infinite dilution of the polymer. This value is linked to the mean molecular weight of a polymer.

The term "hydraulic composition" is intended to define any composition which has hydraulic setting, and quite particularly mortars and concretes which are intended for all construction markets (building works, civil engineering or prefabrication sites).

The term "sand" is intended to define granulates having a mean granulometric size of between 0 and 6 mm, preferably between 0 and 4 mm. They may be of any mineral, calciferous, siliceous or siliceous limestone type, or any other type. This definition also includes fillers or other specific inorganic substances which are likely to be present in hydraulic compositions.

The term "clays" is intended to refer to aluminium and/or magnesium silicates, in particular phyllosilicates having a lamellar structure, which are typically spaced with approximately from 7 to approximately 14 Angstroms. However, this term also refers to clays of other types, in particular amorphous clays. Clays which are commonly found in sands include in particular montmorillonite, illite, kaolinite, muscovite and chlorite. Clays may be of the 2:1 type but also of the 1:1 type (kaolinite) or 2:1:1 type (chlorite).

The term "active substance" is intended to refer to the constituents of the composition which have an effect on the properties of the hydraulic composition, excluding constituents which form the carrier, in particular the solvents or dispersing agents, emulsifiers and other additives.

The invention is based on the finding that cationic polymers which have a specific density of cationic charge and molecular weight, preferably in association with anionic polymers, are particularly effective for inerting the impurities in hydraulic compositions.

According to the invention, the cationic polymer which is advantageous for optimising the inerting effect has a cationicity greater than 0.5 meq/g, preferably greater than 1 meq/g, and in particular greater than 2 meq/g.

According to the invention, the cationic polymer further has a molecular weight which is expressed by an intrinsic viscosity less than 1 dl/g, preferably less than 0.8 dl/g, and in particular less than 0.6 dl/g.

Advantageously, the composition comprises at least 50% by weight, and in particular at least 70%, and quite particularly from 70 to 80% by weight of cationic polymer.

The cationic polymer may have a linear, comb or branched structure. Preferably, the cationic polymer is linear.

Cationic groups may be in particular phosphonium, pyridinium, sulphonium and quaternary amine groups, the last ones being preferred. These cationic groups may be located in the chain of the polymer or as a pendant group.

A large number of cationic polymers are known per se. Polymers of this type may be obtained directly using one of the known methods of polymerisation, such as radical polymerisation, polycondensation or polyaddition.

They may also be prepared by means of post-synthetic modification of a polymer, for example, by means of grafting groups which carry one or more cationic functions to a polymer chain which carries appropriate reactive groups.

The polymerisation is carried out starting with at least one monomer which carries a cationic group or an appropriate precursor thereof.

Polymers obtained from monomers carrying amine and imine groups are particularly advantageous. Nitrogen can be quaternised after polymerisation in known manner, for example, by means of alkylation using an alkylating compound, for example, with methyl chloride, or in an acid medium, by means of protonation.

Cationic polymers containing cationic groups of quaternary amine are particularly appropriate.

Monomers which already carry a cationic quaternary amine function may include in particular the salts of diallyldialkyl ammonium, quaternised (meth)acrylates of dialkylaminoalkyl and (meth)acrylamides N-substituted by a quaternised dialkylaminoalkyl.

The polymerisation can be carried out with non-ionic monomers, preferably having a short chain, comprising from 2 to 6 atoms of carbon. Anionic monomers may also be present so long as they do not affect the cationic groups.

In the context of the modification of polymers by means of grafting, it is possible to mention grafted natural polymers, such as cationic starches.

Advantageously, the cationic polymer contains groups whose cationic character is present only in an acid medium. Tertiary amine groups, which are cationic by means of protonation in an acid medium, are particularly preferred. The absence of ionic nature in hydraulic compositions of the concrete or mortar type having an alkaline pH further renders them robust with regard to other ionic, in particular anionic, compounds.

By way of example, it is possible to mention cationic polymers from the polyvinylamine family which can be obtained by means of polymerisation of N-vinylformamide, followed by hydrolysis. Quaternised polyvinylamines may be prepared as described in the U.S. Pat. No. 5,292,441. Polymers of the polyethyleneimine type are also suitable. The latter are quaternised by means of protonation.

Particularly preferred are the cationic polymers obtained by means of polycondensation of epichlorohydrin with a mono or dialkylamine, in particular methylamine or dimethylamine. Their preparation is described, for example, in U.S. Pat. No. 3,738,945 and U.S. Pat. No. 3,725,312.

The cationic polymer unit obtained by means of polycondensation of dimethylamine and epichlorohydrin can be represented as follows:

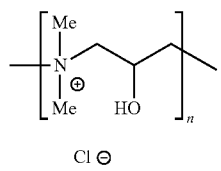

Also appropriate are polymers of the polyacrylamide type modified by means of a Mannich reaction, such as polyacrylamide N-substituted by a dimethylaminomethyl group.

Also appropriate are cationic polymers which are obtained by means of polycondensation of dicyandiamide and formaldehyde. These polymers and the method for obtaining them are described in the patent FR 1 042 084.

The invention thus also relates to a method for inerting clays in sands which are intended for the preparation of hydraulic compositions, wherein during the production of the sand, the sand is placed in contact with a polymer obtainable by condensation of dicyandiamide with formaldehyde, optionally in the presence of other compounds.

According to a preferred embodiment, the polymer is obtainable by condensation of dicyandiamide with formaldehyde in the presence of:

A) a polyalkylene glycol; and/or
B) a polyalkoxylated polycarboxylate; and/or
C) an ammonium derivative.

The exact chemical constitution of the polymer obtained in this manner is not known precisely. It will therefore be described below substantially using the preparation method thereof.

Method of Preparation

The polymer is obtainable by condensation of dicyandiamide with formaldehyde, optionally in the presence of other compounds, in particular a polyalkylene glycol (A), a polyalkoxylated polycarboxylate (B) and/or a quaternisation agent (C).

The condensation reaction between dicyandiamide and formaldehyde requires 2 moles of formaldehyde for 1 mole of dicyandiamide, according to the following reaction diagram (I):

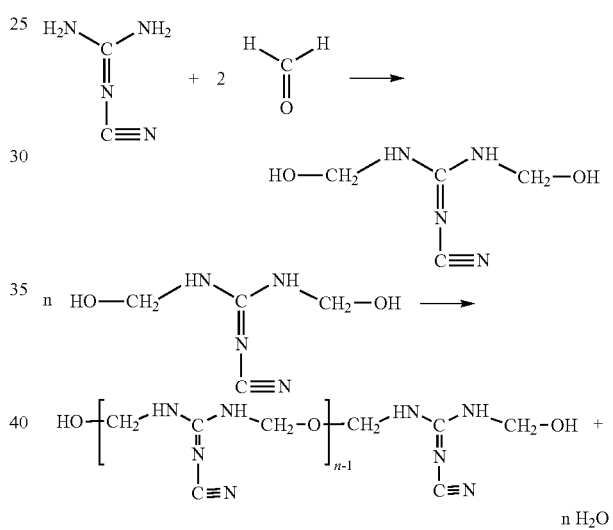

In this manner, the molar ratio between formaldehyde and dicyandiamide is preferably in the range of from 0.8:1 to 4:1, in particular from 1:1 to 3:1. A molar excess greater than 4 does not provide any additional advantage, but may lead to an undesirable setting of the reaction mixture.

It is particularly preferred to carry out the reaction with a slight stoichiometric excess of formaldehyde, with a molar ratio between formaldehyde and dicyandiamide in the range of 2.2:1 to 2.8:1.

Preferably, the polymer is obtained by means of condensation of formaldehyde with dicyandiamide in the presence of additional compounds. This allows the properties of the polymer to be adjusted, in particular the solubility thereof in water and the affinity thereof with respect to clays.

The polyalkylene glycol (compound A) is preferably a compound having the formula (I):

$$R^2-O-[R^1-O]_n-R^3$$

where:

$R^1$ is an alkyl group of $C_1$ to $C_4$, preferably an ethyl and/or propyl group;

$R^2$ and $R^3$ are, independently of each other, a hydrogen atom or an alkyl group of $C_1$ to $C_4$, preferably a methyl group; and n is a number from 25 to 1000.

By way of example, it may be polyethylene glycol, polypropylene glycol, a copolymer of ethylene oxide/propylene oxide or an admixture of these different compounds. Preferably, it is polyethylene glycol.

The molecular weight of the compound A is preferably from 1000 to 35000.

Viscosity measurements have shown that the presence of the compound A modifies the structure of the polymer formed and the efficiency levels thereof.

The quantity of compound A optionally used in the reaction is in principle less than that of the main reactants dicyandiamide and formaldehyde.

In this manner, the reaction admixture generally contains from 0 to 10%, preferably from 0.5 to 3, and quite particularly from 0.8 to 1% by weight of compound A.

The polyalkoxylated polycarboxylate (compound B) is a comb polymer which comprises a main hydrocarbon chain to which both lateral carboxylic groups and alkoxylated groups are connected, in particular groups of propylene oxide (PO), ethylene oxide groups (EO) and/or combinations thereof. The lateral groups may be ionic or non-ionic. It is preferably a compound having the following formula (II):

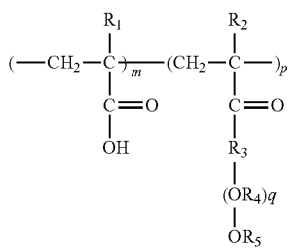

where:
$R^1$ and $R^2$ are, independently of each other, a hydrogen atom or a methyl group;
$R^3$ and $R^4$ are, independently of each other, an alkylene group of $C_1$ to $C_4$, preferably an ethylene or propylene group or one of the combinations thereof;
$R^5$ is a hydrogen atom or an alkyl group of $C_1$ to $C_4$, preferably a methyl group;
m is a whole number from 2 to 100;
p is a whole number from 2 to 100; and
q is a whole number from 2 to 100.

The level of ester of the compound B, given by the ratio p/(m+p), may be from 10 to 60% and in particular from 20 to 40%.

Advantageously, the reaction admixture contains from 0.1 to 10%, preferably from 0.5 to 5, and quite particularly from 0.5 to 2% by weight of compound B.

The ammonium derivative (compound C) has the main function of increasing the ionic character of the polymer by providing cationic functions. The ionic character of the polymer contributes greatly to the solubility thereof in water and the affinity thereof with respect to clays, and is therefore advantageous with respect to the intended use.

Preferably, the ammonium ion of the ammonium derivative has the following formula (IV):

where the $R^6$ groups are identical or different and represent H or an alkyl group of $C_1$ to $C_6$.

Appropriate ammonium derivatives may include in particular ammonium halides, such as ammonium chloride, ammonium bromide, and ammonium iodide, ammonium sulphate and ammonium acetate, ammonium chloride being preferred.

The quantity of compound C used may vary widely. However, the molar ratio between the compound C and the dicyandiamide is preferably from 1 to 1.5 and quite particularly from 1.1 to 1.3. Typically, the reaction admixture contains from 1 to 10%, preferably from 3 to 8%, and quite particularly from 6 to 8% by weight of compound C.

The condensation reaction takes place in an appropriate solvent, water being quite particularly preferred.

The quantity of solvent in the reaction admixture is selected in order to allow the solubilisation of the various constituents. By way of example, the reaction admixture may contain from 10 to 80% by weight, preferably from 20 to 70% by weight of solvent.

Generally, it is preferable to limit the quantity of water in the reaction admixture in order to displace the equilibrium of the condensation reaction towards the desired product. If a diluted product is desired, it is therefore advantageous to add the complement of water after the reaction.

It may be advantageous to add other additives which are conventional in polymerisations, such as molecular termination agents. These compounds allow the size of the synthesised molecules and therefore the molar mass thereof to be controlled and thus allow the polydispersity index thereof to be reduced. Appropriate termination agents may include in particular sulphamic acid.

The condensation reaction takes place rapidly, generally within approximately 30 minutes to approximately 4 hours. The speed of the reaction depends on the temperature which may be between ambient temperature and the boiling point of the reaction admixture. Preferably, it is between 20 and 95° C., preferably between 60 and 70° C. At a lower temperature, the reaction time will be longer. Prolonged retention at high temperature is, however, undesirable as it may lead to the degradation of the product.

Advantageously, the polymer is used directly after the reaction, with no prior purification. It may therefore contain products other than the polymer anticipated according to the reaction diagram (I) shown above.

The polymer obtained is particularly advantageous for neutralising the negative effects of the clays contained in some sands. It further has the following advantages:
  it allows the quantity of water or wetting agent required to obtain a desired fluidity to be reduced;
  it is effective with different clays;
  it does not affect the characteristics of the mortar in the event of an excess measure;
  it does not affect the levels of mechanical strength, neither in the short term, nor in the long term;
  it does not have any setting retarding effect; and
  it is stable over time and is resistant to heat and frost.

Preferably, the composition also comprises, in addition to a specific cationic polymer, an anionic polymer.

Preferably, the anionic polymer has a molecular weight less than 200000 g/mol, preferably less than 100000 and preferably less than 80000 g/mol.

The anionic polymer may have a linear, branched or comb structure.

Preferably, at least one of the cationic and anionic polymers has a comb structure.

Quite particularly preferred is a comb anionic polymer. In this case the main chain is generally hydrocarbon.

The anionic polymer may comprise in particular carboxylic or sulphonic groups.

Anionic groups are preferably located in the pendant groups.

The anionic polymer may further contain non-ionic pendant groups, in particular, polyether groups. The polyether groups generally comprise units of ethylene oxide or propylene oxide or a combination of both.

A large number of anionic polymers as described are known per se.

They may be obtained directly by means of co-polymerisation, a method described in the patents EP 0056627, JP 58074552, U.S. Pat. No. 5,393,343.

They may also be prepared by means of post-synthetic modification of a polymer, as described, for example, in the U.S. Pat. No. 5,614,017.

A composition comprising the two ionic polymers having an opposing charge is particularly advantageous. It is surprisingly stable and does not form any precipitate.

It is assumed that this effect is linked to the steric hindrance of the comb polymer, which limits the accessibility of the charges carried by the polymer and thus prevents the precipitation of the polymers having an opposing charge.

On the other hand, it has been shown that the association of the two polymers is particularly effective for inerting impurities in hydraulic compositions.

Advantageously, the composition comprises a maximum of 50% by weight and in particular a maximum of 30% by weight of anionic polymer. A composition comprising from 20 to 30% by weight of anionic polymer is particularly preferred.

The composition may be used, depending on the intended use, in the form of a solid (granules, balls), liquid or emulsion. Preferably, it is in the form of an aqueous solution. It may comprise, in addition to the active substance and the solvent (s), in particular conventional additives.

The measuring is particularly straightforward for liquid forms. On the other hand, taking into account the relatively low molecular weight of the macromolecules selected, it is possible to use aqueous solutions having high concentrations of polymer with no problem linked to high levels of viscosity. It is particularly advantageous to use high concentrations of polymer in order to reduce costs (transport, storage). The concentration in terms of polymer in the solution may vary, but is generally between 20 and 80% by weight.

The composition may further contain other conventional additives, such as stabilisers.

The composition described is particularly advantageous for clays which are present in specific constituents of the intended compositions. These impurities may affect the properties of the hydraulic compositions, which may or may not comprise superplasticisers.

The content in terms of impurities of the constituent(s) is limited if at all by economic considerations. Consequently, materials will generally be processed which have a clay content of from 0.5 to 5% by weight.

The processing of materials containing clays is particularly simple and rapid. The polymer composition has a high level of affinity with respect to clays, both swelling and nonswelling. It is thus in principle sufficient to place the composition in contact with the material in order to ensure inerting of the clays contained therein. A contact of a few seconds is generally sufficient.

Advantageously, the composition is added to the hydraulic composition or one of the constituents thereof by means of spraying.

In the case of a specific material, a mixing operation is carried out during or after the processing operation in order to ensure good distribution of the composition and obtain a material which is processed in a homogeneous manner.

Clays are a common source of impurities in sands. Therefore, according to one embodiment of the invention, sand is processed with the composition.

Preferably, sand is brought into contact with the polymer by means of spraying the product in an aqueous solution onto the sand.

The sand is preferably processed in the dry state. The sand thus preferably has a moisture content of less than 10% by weight. It has been found that the efficiency of the polymer decreases with the water content of the sand. The processing of the sand is therefore preferably carried out in a quarry.

In order to ensure good distribution of the polymer and obtain a sand which is processed in a homogeneous manner, the sand is preferably mixed.

The spraying may take place in a container, for example, in a casing having baffle plates at the outlet of a conveyor. This embodiment further ensures a low level of loss of the product. In a variant, it is conceivable to spray a solution of the polymer in a mixer which is placed at the outlet of the belt. It may also be envisaged to prepare a pre-mixture of a small quantity of sand with the product, then to add this pre-mixture to the sand.

The polymer is preferably applied to the sand in an appropriate quantity to ensure the complete inerting of the clays present in the sand and thus prevent an excess measure in terms of superplasticiser.

However, a partial processing may be envisaged and use with a higher quantity does not impair the desired properties of the hydraulic composition. It is thus not necessary to measure beforehand the quantity of clay present in the sand in order to determine the required quantity of polymer.

The quantity of polymer required for inerting depends principally on the clay content of the sand. It can also vary in accordance with the nature of the clays present. By way of example, the processing of a sand is generally satisfactory with a measure of from 2 to 20%, preferably from 5 to 10% by weight of polymer relative to the weight of dry clay in the sand.

The composition can also be added to one or more of the constituents containing the harmful impurities. It can also be added at the time of preparation of the hydraulic composition, for example, in the mixing water.

The composition can therefore be used both in a quarry and in a concrete mixing plant.

Direct processing of the constituents, for example, in a sand quarry, is, however, generally more efficient and preferred for this reason.

The constituents processed in this manner may be used in a conventional manner, in particular for the preparation of hydraulic setting compositions. They are advantageous in the preparation of hydraulic compositions which have consistent properties.

In particular, sands which are processed in this manner are advantageous in the preparation of hydraulic compositions, in which clays may impair the efficiency of the superplasticisers. They can be used in conventional manner for the preparation of hydraulic setting compositions.

It has been found that this processing method is very versatile. It provides very satisfactory results for different cements. Furthermore, the efficiency thereof is not limited to a specific class of clay.

Hydraulic compositions comprising sands having a clay content processed with the polymer have rheological properties which are comparable to those which are prepared with sands which have no clay, with no excess measure of superplasticiser and therefore a lower cost.

This method therefore allows the quantity of water or wetting agent required to produce a desired level of fluidity to be reduced.

Furthermore, the composition described advantageously does not inhibit the properties of the hydraulic compositions, even in the case of excess measures. In particular, no effects involving air incorporation or setting retardation are observed. Furthermore, it does not affect the other characteristics of the hydraulic compositions, such as the workability and the durability thereof, the levels of mechanical strength in the short and long term and the setting time.

The invention, according to a second aspect, thus relates to a method for preparing hydraulic compositions comprising a step which involves adding to the hydraulic composition, or one of the constituents thereof, a composition as described above comprising a cationic polymer which is preferably associated with an anionic polymer.

This method allows even constituents which are heavily polluted to be processed. The polymer composition described is effective at a small measure and thus makes the inerting of clays economically viable on an industrial scale. Furthermore, it is stable over time and is resistant to heat and frost.

Finally, the use of the composition does not require the provision of specific equipment.

Consequently, the composition described can be effective over a large range of conditions, for different types of hydraulic composition and clay.

The invention will be described in greater detail using the following non-limiting examples.

EXAMPLES

Preparation of Polymers a) Anionic Polymer

Anionic polymers are synthesised according to the operating method described below:

Copolymer No. 1 (Dispersant No. 1):

The operating method is identical to that used for the copolymer No. 2 but the molar ratio methacrylic acid/polyethylene glycol methyl ether methacrylate 1100 is 60/40.

The synthesis results in a copolymer of polyethylene oxide methacrylate 1100 and methacrylic acid, with a molar ratio of 40/60 and a molecular weight of 40000 g/mol.

Copolymer No. 2 (Dispersant No. 2):

In a 1l reactor provided with mechanical agitation means, a heating system and nitrogen inerting, there is loaded:

| | |
|---|---|
| tetrahydrofuran | 180.0 g |
| methacrylic acid | 28.6 g |
| polyethylene glycol methyl ether methacrylate 1100 | 91.4 g |
| mercaptoacetic acid | 0.24 g |

A solution of an initiator is prepared by weighing 0.63 g of 2,2'-azo-bis-(2,4-dimethylvaleronitrile) (Vazo 52 from Dupont) in 10.0 g of tetrahydrofuran (THF).

The reaction medium is heated to 60° C. with agitation, and with degassing under $N_2$. The catalyst solution is added to the reaction medium and the solution is allowed to react for 5 hours 30 minutes at a temperature of 60° C. In order to stabilise the THF, a small quantity of water is added. This is then distilled under a vacuum in order to eliminate the solvent.

The product obtained is a viscous liquid which is diluted with water in order to obtain a solution having a concentration close to 30% by weight.

The synthesis leads to a copolymer of polyethylene oxide methacrylate 1100 and methacrylic acid, with a molar ratio of 20/80 and a molecular weight of 40000 g/mol.

b) Cationic Polymer

Cationic polymers are characterised using their cationicity and molecular weight.

b1) Cationicity

The cationicity or density of cationic charges (in meq/g) represents the quantity of charges (in mmol) carried per 1 g of polymer. This property is measured by means of colloidal titration using an anionic polymer in the presence of a coloured indicator which is sensitive to the ionicity of the polymer in excess.

In the following examples, the cationicity was determined in the following manner. 60 ml of a buffer solution of sodium phosphate at 0.001 M-pH6 and 1 ml of o-toluidine blue solution at $4.1 \cdot 10^{-4}$ M, then 0.5 ml of cationic polymer solution to be measured are introduced into an appropriate container.

This solution is titrated with a solution of potassium polyvinylsulphate until the indicator changes.

The cationicity is obtained with the following relationship:

$$\text{Cationicity (meq/g)} = (V_{epvsk} * N_{pvsk})/(V_{pc} * C_{pc})$$

where:

$V_{pc}$ is the volume of cationic polymer solution;
$C_{pc}$ is the concentration of cationic polymer in solution;
$V_{epvsk}$ is the volume of potassium polyvinylsulphate solution; and
$N_{pvsk}$ is the normality of the potassium polyvinylsulphate solution.

b2) Intrinsic Viscosity

The measurements of intrinsic viscosity of the cationic polymers are carried out in a 3M NaCl solution, with a capillary viscosimeter of the Ubbelhode type, at 25° C.

The flow time in the capillary tube between two reference points is measured for the solvent and polymer solutions at different concentrations. The reduced viscosity is calculated by dividing the specific viscosity by the concentration of the polymer solution. The specific viscosity is obtained for each concentration, by dividing the difference between the flow times of the polymer solution and the solvent by the flow time of the solvent. By marking the line of the reduced viscosity in accordance with the concentration of the polymer solution, a straight line is obtained. The point at which this straight line intersects with the ordinate corresponds to the intrinsic viscosity for a concentration which is equal to zero.

c) Preparation of a Mortar

In the bowl of a Perrier mixer, a mortar is prepared having the composition indicated in Table 1.

Sand is added, then the prewetting water with agitation at low speed (140 rpm). This is allowed to rest for four minutes before the binding agents (cement and filler) are introduced. The sands used are those indicated in Table 1. This is mixed again for 1 minute at low speed, then the mixing water supplemented with superplasticiser is gradually added within 30 seconds. Finally, this is mixed for a further 2 minutes at 280 rpm.

The efficiency of inerting is evaluated by measuring the spreading of the mortars prepared in this manner. The inertant is added to the sand. The plasticiser is added to the mixing water. The W/C ratio is maintained at a consistent level for the different series of tests.

TABLE 1

Composition of mortar N°1 (with superplasticiser)

| | Quantity [kg/m$^3$] |
|---|---|
| Cement CEM I 52.5 N according to EN 197 | 382 |
| Filler BL 200 (Granicalcium OMYA) | 268 |
| Sand <0.1 mm BL 200 (Granicalcium OMYA) | 103 |
| Sand 0.1-0.5 mm (Granicalcium OMYA) | 458 |
| Sand 0.5-1 mm (Granicalcium OMYA) | 229 |
| Sand 1-2.5 mm (Granicalcium OMYA) | 350 |
| Sand 2-4 mm (Granicalcium OMYA) | 257 |
| Superplasticiser (Glenium 27 from MBT) | 6 |
| Prewetting water | 84 |
| Mixing water | 185 |
| Total water | 269 |

TABLE 2

Composition of mortar N° 2 (without superplasticiser)

| | Quantity [kg/m$^3$] |
|---|---|
| Cement CEM I 52.5 N according to EN 197 | 380 |
| Airborne dust (Carling) | 162 |
| Sand <0.1 mm BL 200 (Granicalcium OMYA) | 254 |
| Sand 0.1-0.5 mm (Granicalcium OMYA) | 435 |
| Sand 0.5-1 mm (Granicalcium OMYA) | 145 |
| Sand 1-2.5 mm (Granicalcium OMYA) | 145 |
| Sand 2-4 mm (Granicalcium OMYA) | 435 |
| Prewetting water | 84 |
| Mixing water | 260 |
| Total water | 344 | d) Measurement of the Workability of the Mortar

The spreading of a mortar is measured in the following manner.

A frustoconical mould which has no base and which is a reproduction on a scale of 0.5 of the Abrams cone (see Standard NF 18-451, 1981), having the following dimensions:

| diameter of the circle of the upper base | 50 +/− 0.5 mm |
|---|---|
| diameter of the circle of the lower base | 100 +/− 0.5 mm |
| height | 150 +/− 0.5 mm | is filled with a freshly prepared mortar in three layers of identical volume, then the mortar is pierced 15 times between each layer using a steel piercing rod having a diameter of 6 mm and a spherical end. The upper surface of the cone is shaved and the cone is raised vertically. The spreading is measured at determined time intervals (5 and 60 min) according to four diameters at 45° with a sliding calliper. The result of the spreading measurement is the mean of the four values at +/−1 mm.

Examples A, B AND B'

Comparison Examples

In order to evaluate the negative effect of clays in hydraulic compositions (mortar type No. 1), the workability is compared for a mortar prepared with a sand with no clay (Example A), with 1% of montmorillonite by weight relative to the weight of sand (montmorillonite from Sardinia, SOCODIS) (Example B) and with 1% of kaolinite by weight relative to the weight of sand (kaolinite BS3, AGS) (Example B').

The results are set out in Table 3 below. It was found that the clays have a negative effect on the spreading.

Example C

Comparison Example

A mortar is prepared as indicated in paragraph (c), but with a sand which is supplemented with 1% by weight of montmorillonite and with the copolymer No. 1 being added after the pre-wetting water.

This is a polymer dispersant of the comb type (dispersant 1).

The spreading is measured at 5 minutes after preparation of the mortar as indicated in paragraph (d). A measure of 6% by weight calculated in terms of dry polymer relative to the weight of clay allows the spreading of the mortar without clay to be achieved. The results are set out in Table 3 below.

Example D

Comparison Example

A mortar is prepared as indicated in paragraph (c), but with a sand which is supplemented with 1% by weight of montmorillonite and with the copolymer No. 2 being added after the pre-wetting water. This is a polymer dispersant of the comb type (dispersant 2).

The spreading is measured at 5 minutes after preparation of the mortar as indicated in paragraph (d). A measure of 6% by weight calculated in terms of dry polymer relative to the weight of clay allows the spreading of the mortar without clay to be achieved. The results are set out in Table 3 below.

Example 1

An aqueous composition is prepared containing polyamine epichlorohydrin-dimethylamine (EPI-DMA) (FL-2250 from SNF) and the dispersant 1 in a weight ratio of 75/25. The solution has a content of 20% of active substance. The polyamine epichlorohydrin-dimethylamine (EPI-DMA) used has a cationicity of 7.3 meq/g and an intrinsic viscosity of 0.04 dl/g.

A mortar is then prepared as indicated in paragraph (c), but with a sand which is supplemented with 1% by weight of montmorillonite and with the composition being added after the pre-wetting water.

The spreading is measured at 5 and 60 minutes after preparation of the mortar as indicated in paragraph (d). A measure of 5% by weight calculated in terms of dry polymer relative to the clay weight allows the spreading of the mortar without clay to be achieved. The results are set out in Table 3 below.

Example 2

An aqueous composition is prepared containing polyamine epichlorohydrin-dimethylamine (EPI-DMA) (FL-2250 from SNF) and the dispersant 1 in a weight ratio of 95/5. The solution has a content of 20% of active substance.

A mortar is then prepared as indicated in paragraph (c), but with a sand which is supplemented with 1% by weight of montmorillonite and with the composition being added after the pre-wetting water.

The spreading is measured at 5 and 60 minutes after preparation of the mortar as indicated in paragraph (d). A measure of 5% by weight calculated in terms of dry polymer relative to the clay weight allows the spreading of the mortar without clay to be achieved. The results are set out in Table 3 below.

Example 3

An aqueous composition is prepared containing polyamine epichlorohydrin-dimethylamine (EPI-DMA) (FL-2250 from SNF) and the dispersant 2 in a weight ratio of 75/25. The solution has a content of 20% of active substance.

A mortar is then prepared as indicated in paragraph (c), but with a sand which is supplemented with 1% by weight of montmorillonite and with the composition being added after the pre-wetting water.

The spreading is measured at 5 minutes after preparation of the mortar as indicated in paragraph (d). A measure of 4.5% by weight calculated in terms of dry polymer relative to the clay weight allows the spreading of the mortar without clay to be achieved. The results are set out in Table 3 below.

Example 4

An aqueous composition is prepared containing polyamine epichlorohydrin-dimethylamine (EPI-DMA) (FL-2250 from SNF) and the dispersant 1 in a weight ratio of 50/50. The solution has a content of 20% of active substance.

A mortar is then prepared as indicated in paragraph (c), but with a sand which is supplemented with 1% by weight of montmorillonite and with the composition being added after the pre-wetting water.

The spreading is measured at 5 and 60 minutes after preparation of the mortar as indicated in paragraph (d). A measure of 5.5% by weight calculated in terms of dry polymer relative to the clay weight allows the spreading of the mortar without clay to be achieved. The results are set out in Table 3 below.

Example 5

A cationic polymer is prepared by means of condensation of dicyandiamide (DCDA) and formaldehyde as follows.

20.3 parts by weight of water, 11.7 parts by weight of ammonium chloride, 18.2 parts by weight of dicyandiamide, then 48.8 parts by weight of formaldehyde (aqueous solution at 37% by weight) are introduced into an enamel reactor which is provided with a thermostat and an agitator, at ambient temperature.

The mixture is heated to 95°, with agitation for two hours. The product obtained has a dry extract of approximately 48%. Prior to storage, the product is diluted to 20% of dry extract.

The polymer obtained has a cationicity of 2.5 meq/g and an intrinsic viscosity of 0.06 dl/g.

A mortar is then prepared as indicated in paragraph (c), but with a sand which is supplemented with 1% by weight of montmorillonite relative to the weight of sand and with the polymer obtained being added after the pre-wetting water.

The spreading is measured at 5 and at 60 minutes after preparation of the mortar as indicated in paragraph (d). A measure of 8% by weight of cationic polymer calculated in terms of dry polymer relative to the clay weight allows the spreading of the mortar without clay to be achieved. The results are set out in Table 3 below.

Example 6

Example 5 is repeated, but with the montmorillonite added to the sand being replaced with kaolinite.

The results are set out in Table 3 below. It was found that the spreading of the mortar with no clay is achieved with a measure of 8% by weight of cationic polymer calculated in terms of dry polymer relative to the clay weight.

Example 7

Example 1 is repeated, but with the mixture of cationic and anionic polymers being replaced with only the polyamine epichlorohydrin-dimethylamine (FL-2250 from SNF).

The results are set out in Table 3 below. It was found that the spreading of the mortar without clay is achieved with a measure of 5.5% by weight of cationic polymer calculated in terms of dry polymer relative to the clay weight. It was also found that the efficiency of the polymer as described in example 5 is lower than the polyamine epichlorohydrin-dimethylamine (FL-2250 from SNF).

Example 8

Example 1 is repeated, but with the copolymer being replaced with tetrabutylammonium bromide (TTB).

The results are set out in Table 3 below. Even a measure of 15% by weight relative to the clay weight does not allow the spreading to be achieved that is obtained for a sand without clay.

Example 9

Example 8 is repeated, but with montmorillonite being replaced with kaolinite.

The results are set out in Table 3 below. Even a measure of 15% by weight relative to the clay weight does not allow the spreading to be achieved that is obtained for a sand with no clay.

TABLE 3

| Example | Measure (% wt dry polymer/wt clay) | Spreading at 5 min (mm) | Spreading at 60 min (mm) | Impurity (% wt/wt of sand) |
|---|---|---|---|---|
| A | — | 320 | 320 | — |
| B | — | 185 | 185 | 1% montmorillonite |
| B' | — | 255 | 255 | 1% kaolinite |
| C | 6 | 300 | — | 1% montmorillonite |
| D | 6 | 295 | — | 1% montmorillonite |
| 1 | 5 | 305 | 305 | 1% montmorillonite |
| 2 | 5 | 290 | 290 | 1% montmorillonite |
| 3 | 4.5 | 300 | 300 | 1% montmorillonite |
| 4 | 5.5 | 300 | 300 | 1% montmorillonite |
| 5 | 8 | 315 | 315 | 1% montmorillonite |
| 6 | 8 | 315 | 310 | 1% kaolinite |
| 7 | 5.5 | 310 | 305 | 1% montmorillonite |
| 8 | 15 | 210 | — | 1% montmorillonite |
| 9 | 15 | 265 | — | 1% kaolinite |

The negative effect of the kaolinite is less pronounced than that of the montmorillonite but the measure in terms of inertant required to neutralise these two types of clay is similar as can be seen in example 5 and 6.

Examples E and F

Comparison Examples

Examples A and B are repeated, respectively, but with the superplasticiser (mortar type No. 2) being omitted.

The results are set out in Table 4 below. It was first found that the clays have a negative effect on the spreading, even in the absence of superplasticiser.

Examples 10 to 12

Examples 1, 2 and 3 are repeated, but with the superplasticiser being omitted. The results are set out in Table 4 below. The polymer composition allows the spreading values of the mortar prepared without clay to be achieved. Furthermore, the required measure is less than for the dispersant alone and it is less than or equal to the measure of the cationic polymer alone. An optimum measure is obtained for a weight ratio of 75/25 between the cationic polymer and the dispersant.

TABLE 4

| Example | Measure (% wt dry polymer/ wt clay) | Spreading at 5 min (mm) | Spreading at 60 min (mm) | Impurity (% wt/wt of sand) |
|---|---|---|---|---|
| E | — | 200 | 165 | — |
| F | — | 125 | 100 | 1% montmorillonite |
| 10 | 8 | 200 | 165 | 1% montmorillonite |
| 11 | 8 | 195 | 160 | 1% montmorillonite |
| 12 | 7.5 | 195 | 160 | 1% montmorillonite |

The tests show that the composition described allows the clays which are present in the hydraulic compositions to be inerted in an effective manner. The composition which contains the two ionic polymers in association is stable. Finally, it is possible to conclude from the results that there is a synergetic effect between the two polymers, given that their individual effectiveness, in terms of measure, is less than that of the composition.

The invention claimed is:

1. A method for inerting clays in sands used in the preparation of a hydraulic composition, comprising the steps of: adding the sands to the hydraulic composition, the sands having a clay content of from 0.5 to 5% by weight, and adding a composition to the hydraulic composition, or to one of the constituents thereof, the composition comprising at least 50% by weight of a cationic polymer having a density of cationic charges greater than 0.5 meq/g and an intrinsic viscosity less than 1 dl/g as an active substance.

2. A method according to claim 1, wherein the hydraulic composition is a concrete or a mortar.

3. A method according to claim 1, wherein the hydraulic composition contains no superplasticiser.

4. A method according to claim 1, wherein the composition is added to the hydraulic composition or to one of the constituents thereof by spraying.

5. A method according to claim 1, wherein the composition is used in a quarry.

6. A method according to claim 1, wherein the composition is used in a concrete mixing plant.

7. A method according to claim 1, wherein the cationic polymer has a density of cationic charges greater than 2 meq/g.

8. A method according to claim 1, wherein the cationic polymer has an intrinsic viscosity less than 0.6 dl/g.

9. A method according to claim 1, wherein the composition further comprises an anionic polymer.

10. A method according to claim 9, wherein the composition comprises a maximum of 50% by weight of anionic polymer as an active substance.

11. A method according to claim 9, wherein at least one of the cationic and anionic polymers has a comb structure.

12. A method according to claim 1, wherein the cationic polymer is linear.

13. A method according to claim 1, wherein the cationic polymer comprises cationic groups of quarternary amine.

14. A method according to claim 1, wherein the cationic polymer is prepared by condensation of epichlorohydrin with a dialkylamine.

15. A method according to claim 14, wherein the dialkylamine is dimethylamine.

16. A method according to claim 9, wherein the anionic polymer contains carboxylic groups.

17. A method according to claim 9, wherein the anionic polymer further comprises polyether groups.

18. A method according to claim 1, wherein the polymer is obtainable by condensation of dicyandiamide with formaldehyde, in the presence of:
A) a polyalkylene glycol.

19. A method according to claim 1, wherein the polymer is obtainable by condensation of dicyandiamide with formaldehyde, in the presence of:
B) a polyalkoxylated polycarboxylate.

20. A method according to claim 1, wherein the polymer is obtainable by condensation of dicyandiamide with formaldehyde, in the presence of:
C) an ammonium derivative.

21. A method according to claim 1, wherein the polyalkylene glycol has the following formula (I):

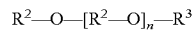

where:
$R^1$ is an alkyl group of $C_1$ to $C_4$;
$R^2$ and $R^3$ are, independently of each other, a hydrogen atom or an alkyl group of $C_1$ to $C_4$; and
n is a number from 25 to 1000.

22. A method according to claim 1, wherein the molar ratio between formaldehyde and dicyandiamide is in the range of from 0.8:1 to 4:1.

23. A method according to claim 18, wherein the polyalkylene glycol is a polyethylene glycol.

24. A method according to claim 19, wherein the polyalkoxylated polycarboxylate has the following formula (II):

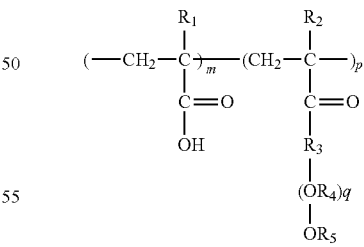

where:
$R^1$ and $R^2$ are, independently of each other, a hydrogen atom or a methyl group;
$R^3$ and $R^4$ are, independently of each other, an alkylene group of $C_1$ to $C_4$;
$R^5$ is a hydrogen atom or an alkyl group of $C_1$ to $C_4$;
m is a whole number from 2 to 100;
p is a whole number from 2 to 100; and
q is a whole number from 2 to 100.

25. A method according to claim 19, wherein the polyalkoxylated polycarboxylate has an ester level of from 10 to 60%.

26. A method according to claim 20, wherein the ammonium ion of the ammonium derivative has the following formula (IV):

$$NH(R^6)_3{}^+$$

where:
the $R^6$ groups are identical or different and represent H or an alkyl group of $C_1$ to $C_6$.

27. A method according to claim 20, wherein the ammonium derivative is ammonium chloride, ammonium sulphate, ammonium iodide, ammonium bromide, ammonium acetate.

28. A method according to claim 20, wherein the molar ratio between the compound C and the dicyandiamide is from 1 to 1.5.

29. A method according to claim 1, wherein the composition is in the form of an aqueous solution.

* * * * *